United States Patent
Zheng et al.

(10) Patent No.: US 11,172,134 B2
(45) Date of Patent: Nov. 9, 2021

(54) PAN-TILT CONTROL METHOD, DEVICE AND SYSTEM

(71) Applicant: HANGZHOU HIKVISION DIGITAL TECHNOLOGY CO., LTD., Zhejiang (CN)

(72) Inventors: Xing Zheng, Hangzhou (CN); Peng Wang, Hangzhou (CN); Tingqun Ye, Hangzhou (CN); Jianfeng Peng, Hangzhou (CN); Zhiqiang Zhou, Hangzhou (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/494,700

(22) PCT Filed: Mar. 15, 2018

(86) PCT No.: PCT/CN2018/079133
§ 371 (c)(1),
(2) Date: Sep. 16, 2019

(87) PCT Pub. No.: WO2018/166498
PCT Pub. Date: Sep. 20, 2018

(65) Prior Publication Data
US 2020/0084386 A1    Mar. 12, 2020

(30) Foreign Application Priority Data

Mar. 16, 2017  (CN) .......................... 201710157819.2

(51) Int. Cl.
*H04N 5/232* (2006.01)
*H04N 7/18* (2006.01)

(52) U.S. Cl.
CPC ..... *H04N 5/23299* (2018.08); *H04N 5/23218* (2018.08); *H04N 7/18* (2013.01)

(58) Field of Classification Search
None
See application file for complete search history.

(56) References Cited

U.S. PATENT DOCUMENTS

2003/0184645 A1* 10/2003 Biegelsen ........... H04L 12/1827
                                                   348/14.1
2007/0097212 A1*  5/2007 Farneman ............. H04N 7/185
                                                   348/143

(Continued)

FOREIGN PATENT DOCUMENTS

CN    101931748 A    12/2010
CN    202737998 U     2/2013

(Continued)

OTHER PUBLICATIONS

International search report of PCT application No. PCT/CN2018/079133 dated Jun. 4, 2018.

(Continued)

*Primary Examiner* — Lindsay J Uhl
(74) *Attorney, Agent, or Firm* — Knobbe, Martens, Olson & Bear, LLP

(57) ABSTRACT

The present application relates to the field of security and protection, and provides a pan-tilt control method, device and system. The method comprises: detecting whether there is a signal source within a monitored region of a pan-tilt camera, the pan-tilt camera comprising a pan-tilt and a camera attached to the pan-tilt; judging, when there is a signal source within the monitored region, whether signals emitted from the signal source are position adjusting signals for indicating a position adjustment on the pan-tilt; and adjusting a position of the pan-tilt according to a position of the signal source when the signals emitted from the signal source are position adjusting signals. In the present application, the trigger delay of the control operation on the pan-tilt camera is reduced.

19 Claims, 10 Drawing Sheets

(56) References Cited

U.S. PATENT DOCUMENTS

| | | |
|---|---|---|
| 2009/0251539 A1 | 10/2009 | Iwasaki |
| 2013/0141588 A1* | 6/2013 | Crookham ......... G06K 9/00342 |
| | | 348/157 |
| 2015/0334356 A1* | 11/2015 | Kim ...................... H04N 5/232 |
| | | 348/143 |
| 2017/0155829 A1 | 6/2017 | Wang et al. |
| 2018/0077355 A1* | 3/2018 | Kouno ................... G08B 25/08 |

FOREIGN PATENT DOCUMENTS

| | | |
|---|---|---|
| CN | 103986878 A | 8/2014 |
| CN | 104486536 A | 4/2015 |
| CN | 104954673 A | 9/2015 |
| CN | 105142089 A | 12/2015 |
| CN | 204906574 U | 12/2015 |
| CN | 105357442 A | 2/2016 |
| CN | 205566506 U | 9/2016 |
| CN | 205657800 U | 10/2016 |
| CN | 106210494 A | 12/2016 |
| CN | 106331466 A | 1/2017 |
| EP | 0813073 A2 | 12/1997 |
| EP | 1551171 A1 | 7/2005 |
| JP | 2017050829 A | 3/2017 |

OTHER PUBLICATIONS

First office action of Chinese application No. 201710157819.2 dated Aug. 2, 2019.
Second office action of Chinese application No. 201710157819.2 dated Feb. 3, 2020.
Extended European search report of counterpart EP application No. 18768353.7 dated Jan. 20, 2020.

* cited by examiner

PAN-TILT CONTROL METHOD, DEVICE AND SYSTEM

This present application is a national phase application of PCT International Application No. PCT/CN2018/079133 filed on Mar. 15, 2018 and entitled "PAN-TILT CONTROL METHOD, DEVICE AND SYSTEM", which claims priority to Chinese Patent Application No. 201710157819.2, filed on Mar. 16, 2017 and entitled "HOLDER CONTROL METHOD, DEVICE AND SYSTEM", the contents of which are incorporated herein by reference in their entirety.

TECHNICAL FIELD

The present disclosure relates to the field of video surveillance, and in particular to methods, devices and systems for controlling a pan-tilt.

BACKGROUND

A pan-tilt is a supporting device for mounting and fixing a camera, and the pan-tilt along with the camera mounted thereto are named as a pan-tilt camera. In the field of video surveillance, the pan-tilt camera has a wide range of applications. It may be used in monitoring a certain region at a preset fixed position, or monitoring one or more regions in a round-robin manner according to certain patterns, for example, by regularly moving the pan-tilt vertically and/or laterally or at other orientations, to achieve an alternate monitor on multiple regions by the pan-tilt camera.

In the related art, the pan-tilt camera may need to shoot a target region outside the current monitored region when an emergency occurs. Generally, an operation personnel may manually adjust the monitored region of the pan-tilt camera. To be specific, the operation personnel needs to log in a client of a control system of the pan-tilt by means of a terminal device, find a corresponding pan-tilt camera on the client, and then perform a corresponding control operation so as to align the pan-tilt camera to the target region for shooting the region where the emergency occurs.

However, by employing the above method for controlling the pan-tilt camera, the operation personnel has to perform the control operation after logging in the client through the terminal device and finding the corresponding pan-tilt camera. As such, the trigger of the control operation on the pan-tilt camera is long.

SUMMARY

The present disclosure provides methods, devices and systems for controlling a pan-tilt for solving the problem in the related art that an operation personnel has to perform the control operation after logging in the client on a terminal device and finding the corresponding pan-tilt and the delay of the control operation on the pan-tilt camera is long. The technical solutions are as follows:

In a first aspect, a method for controlling a pan-tilt, used in a device for controlling a pan-tilt, is provided. The method comprises:

detecting whether there is a signal source within a monitored region of a pan-tilt camera, the pan-tilt camera comprising a pan-tilt and a camera attached to the pan-tilt;

judging, when there is a signal source within the monitored region, whether signals emitted from the signal source are position adjusting signals for indicating a position adjustment on the pan-tilt; and adjusting a position of the pan-tilt according to a position of the signal source when the signals emitted from the signal source are position adjusting signals.

Optionally, said adjusting a position of the pan-tilt according to a position of the signal source comprises:

adjusting an angle of the pan-tilt so that images of the signal source captured by the camera are located within a preset region in monitored images from the camera, wherein the monitored images are images obtained by the camera through shooting the monitored region.

Optionally, said detecting whether there is a signal source within a monitored region of a pan-tilt camera comprises:

detecting whether there is an image of a signal source in monitored images from the camera, wherein the monitored images are images obtained by the camera through shooting the monitored region;

determining that there is a signal source within the monitored region of the pan-tilt camera when there is an image of a signal source in the monitored images from the camera; and determining that there is no signal source within the monitored region of the pan-tilt camera when there is no image of a signal source in the monitored images from the camera.

Optionally, the signal source is a light source, the signals are light signals, and said judging whether signals emitted from the signal source are position adjusting signals for indicating a position adjustment on the pan-tilt comprises:

acquiring a plurality of successive monitored images of the monitored region by the camera;

determining an emission frequency of the light signals from the signal source according to the plurality of successive monitored images; and determining that the signals emitted from the signal source are position adjusting signals when the emission frequency of the light signals is within a preset frequency range.

Optionally, the signal source is a light source, the signals are light signals, and said judging whether signals emitted from the signal source are position adjusting signals for indicating a position adjustment on the pan-tilt comprises:

acquiring a plurality of successive monitored images of the monitored region by the camera;

determining a change pattern of a target parameter of the light signals from the signal source according to the plurality of successive monitored images, wherein the target parameter comprises at least one of a shape, a color or brightness; and determining that the signals emitted from the signal source are position adjusting signals when the change pattern of the target parameter of the light signals conforms to a preset parameter change pattern.

Optionally, before said judging whether signals emitted from the signal source are position adjusting signals for indicating a position adjustment on the pan-tilt, the method further comprises:

judging whether the signals emitted from the signal source are state adjusting signals for indicating a state adjustment on the pan-tilt; and setting a state of the pan-tilt to an adjustable state when the signals emitted from the signal source are state adjusting signals.

Optionally, after said adjusting a position of the pan-tilt according to a position of the signal source, the method further comprises:

setting the state of the pan-tilt to a non-adjustable state after determining that there is no signal source within the monitored region of the pan-tilt camera.

Optionally, the preset region is a center region of a monitored image, the signal source is a point light source; and the adjusting an angle of the pan-tilt so that images of the signal source captured by the camera are located within a preset region in monitored images from the camera comprises:

adjusting the angle of the pan-tilt so that the images of the signal source captured by the camera coincide with a center point of the monitored images from the camera.

In a second aspect, a device for controlling a pan-tilt is provided. The device comprises:

a detecting module configured to detect whether there is a signal source within a monitored region of a pan-tilt camera, the pan-tilt camera comprising a pan-tilt and a camera attached to the pan-tilt;

a first judging module configured to judge, when there is a signal source within the monitored region, whether signals emitted from the signal source are position adjusting signals for indicating a position adjustment on the pan-tilt; and an adjusting module configured to adjust a position of the pan-tilt according to a position of the signal source when the signals emitted from the signal source are position adjusting signals.

Optionally, the adjusting module is configured to:

adjust an angle of the pan-tilt so that images of the signal source captured by the camera are located within a preset region in monitored images from the camera, wherein the monitored images are images obtained by the camera through shooting the monitored region.

Optionally, the detecting module comprises:

a detecting submodule configured to detect whether there is an image of a signal source in monitored images from the camera, wherein the monitored images are images obtained by the camera through shooting the monitored region;

a first determining submodule configured to determine that there is a signal source within the monitored region of the pan-tilt camera when there is an image of a signal source in the monitored images from the camera; and a second determining submodule configured to determine that there is no signal source within the monitored region of the pan-tilt camera when there is no image of a signal source in the monitored images from the camera.

Optionally, the signal source is a light source, the signals are light signals, and the first judging module is configured to:

acquire a plurality of successive monitored images of the monitored region by the camera;

determine an emission frequency of the light signals from the signal source according to the plurality of successive monitored images; and determine that the signals emitted from the signal source are position adjusting signals when the emission frequency of the light signals is within a preset frequency range.

Optionally, the signal source is a light source, the signals are light signals, and the first judging module is configured to:

acquire a plurality of successive monitored images of the monitored region by the camera;

determine a change pattern of a target parameter of the light signals from the signal source according to the plurality of successive monitored images, wherein the target parameter comprises at least one of a shape, a color or brightness; and determine that the signals emitted from the signal source are position adjusting signals when the change pattern of the target parameter of the light signals conforms to a preset parameter change pattern.

Optionally, the device further comprises:

a second judging module configured to judge whether the signals emitted from the signal source are state adjusting signals for indicating a state adjustment on the pan-tilt; and a first setting module configured to set a state of the pan-tilt to an adjustable state when the signals emitted from the signal source are state adjusting signals.

Optionally, the device further comprises:

a second setting module configured to set the state of the pan-tilt to a non-adjustable state after determining that there is no signal source within the monitored region of the pan-tilt camera.

Optionally, the preset region is a center region of a monitored image, the signal source is a point light source, and the adjusting module is configured to:

adjust the angle of the pan-tilt so that the images of the signal source captured by the camera coincide with a center point of the monitored images from the camera.

In a third aspect, a system for controlling a pan-tilt is provided, wherein the system comprises:

the device for controlling a pan-tilt according to any of the second aspect, and a pan-tilt camera comprising a pan-tilt and a camera attached to the pan-tilt.

Optionally, the system for controlling a pan-tilt further comprises a signal source.

Optionally, the device for controlling a pan-tilt is integrated into the camera.

In a fourth aspect, a device for controlling a pan-tilt is provided, wherein the device comprises:

one or more processors; and a memory, wherein one or more programs are stored in the memory and configured to be executed by the one or more processors to perform the method for controlling a pan-tilt according to any of the first aspect.

In a fifth aspect, a non-volatile computer-readable storage medium having code instructions stored therein is provided, wherein the code instructions are executed by a processor to perform the method for controlling a pan-tilt of any of the first aspect.

The technical solutions provided by the aspects of the present disclosure may at least include the following advantages.

The method, device and system for controlling a pan-tilt provided by the aspects of the present disclosure are capable of: detecting whether there is a signal source within the monitored region; when there is a signal source within the monitored region, judging whether signals emitted from the signal source are position adjusting signals; when the signals emitted from the signal source are determined to be position adjusting signals, adjusting, by the pan-tilt in the pan-tilt camera, the position of the pan-tilt flexibly according to the position of the signal source, so that the pan-tilt camera could shoot the target region instantly, thereby effectively reducing the trigger delay of the control operation on the pan-tilt camera.

BRIEF DESCRIPTION OF THE DRAWINGS

FIG. 3-1 is a flowchart of a method for controlling a pan-tilt according to examples of the present disclosure;

FIG. 3-2 is a flowchart of a method for judging whether a signal source emits state adjusting signals according to examples of the present disclosure;

FIG. 3-3 is a flowchart of another method for judging whether a signal source emits state adjusting signals according to examples of the present disclosure;

FIG. 3-4 is a flowchart of a method for judging whether a signal source emits position adjusting signals according to examples of the present disclosure;

FIG. 3-5 is a schematic diagram of a monitored image according to examples of the present disclosure;

FIG. 3-6 is a schematic diagram of a monitored image derived from FIG. 3-5 after the pan-tilt being adjusted by a method for controlling a pan-tilt according to examples of the present disclosure;

FIG. 4 is a schematic structural diagram of a device for controlling a pan-tilt according to examples of the present disclosure;

FIG. 5-1 is a schematic structural diagram of a detecting module according to examples of the present disclosure;

FIG. 5-2 is a schematic structural diagram of another device for controlling a pan-tilt according to examples of the present disclosure;

FIG. 5-3 is a schematic structural diagram of a further device for controlling a pan-tilt according to examples of the present disclosure; and FIG. 6 is a schematic structural diagram of a device for controlling a pan-tilt according to another example of the present disclosure.

DETAILED DESCRIPTION

The examples of the present disclosure will be described in further detail with reference to the accompanying drawings, so as to present the objects, technical solutions, and advantages of the present disclosure more clearly.

Figure 1:
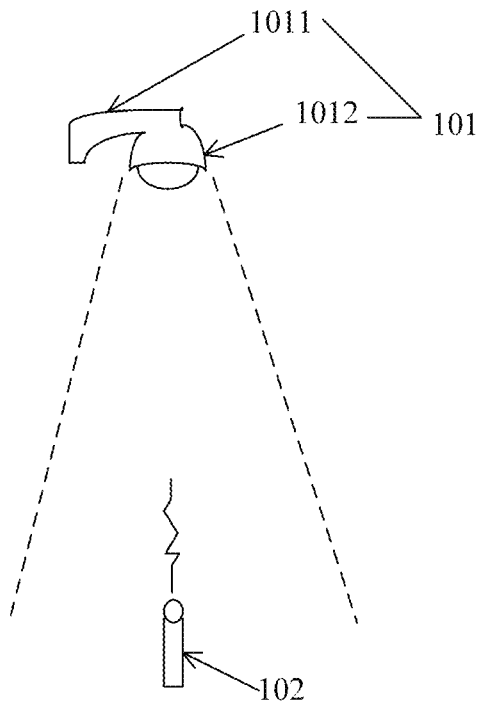
FIG. 1 is a schematic structural diagram of a system for controlling a pan-tilt involved in a method for controlling a pan-tilt according to examples of the present disclosure.

FIG. 1 is a schematic structural diagram of a system for controlling a pan-tilt involved in a method for controlling a pan-tilt according to examples of the present disclosure. As shown in FIG. 1, the system for controlling a pan-tilt may include: a pan-tilt camera 101 and a signal source 102, wherein the pan-tilt camera 101 may include a pan-tilt 1011 and a camera 1012 attached to the pan-tilt 1011. The system for controlling a pan-tilt further includes: a device for controlling a pan-tilt (not shown in FIG. 1), which may be connected with the pan-tilt 1011 and the camera 1012 respectively and is configured to analyze monitored images shot by the camera 1012 so as to control the movement of the pan-tilt 1011. The monitored images are images obtained by the camera through shooting the monitored region.

Optionally, the signal source 102 may be provided with a signal source control module, by which an operation personnel can control signals emitted from the signal source 102. The signal source 102 may further include a signal generator connected with the signal source control module for emitting signals under the control of the signal source control module.

As an example, the signal source may emit at least one type of signals. For example, the signals may be either state adjusting signals or position adjusting signals, wherein the state adjusting signals are configured to set the state of the pan-tilt to an adjustable state; the position adjusting signals are configured to enable the pan-tilt to be adjusted in position according to the position of the signal source; and the process of adjusting the position of the pan-tilt may be a process of adjusting the angle (which may be an angle with respect to a fixed reference system that may either be a fixed surface on which the pan-tilt is located or a horizontal or vertical plane) of the pan-tilt. As an example, when the signal source only emits one type of signals, the signals emitted from the signal source may be position adjusting signals; and when the signal source emits two types of signals, the signals emitted from the signal source may be state adjusting signals and position adjusting signals.

Optionally, the signal source is provided with at least one button connected with the signal source control module for controlling the signal source, and the operation personnel may control the emission of signals from the signal source through the at least one button.

As an example, the signal source may be provided with one button, and the operation personnel may align the signal source to the camera and then press the button to enable the signal source to emit signals. Exemplarily, this button may have at least one shift position, which may be distinguishably controlled by varying at least one of the pressing force, the pressing orientation or the number of pressing times, and the operation personnel could control the shift position(s) of the button so as to emit different types of signals. During the actual applications of the present disclosure, the operation personnel may adjust the button to a certain shift position, then the signal source control module determines the signal type corresponding to said certain shift position (for example, a corresponding relation between the shift position and the signal type may be stored in the signal source control module, and the signal type corresponding to said certain shift position could be obtained by referring to the corresponding relation), and then controls the signal generator of the signal source to emit the corresponding type of signals.

As an example, when the signal source is provided with at least two buttons, each button may have at least one shift position and correspond to one signal type, and each shift position of a button corresponds to one type of signal emission strength. When the operation personnel aligns a signal source to the camera and then presses a button, the signal source may emit signals, and through the buttons controlled by the operation personnel, different types of signals could be emitted. During the actual applications of the present disclosure, when the operation personnel presses a certain button, the signal source control module determines the signal type corresponding to the button (for example, a corresponding relation between the button and the signal type may be stored in the signal source control module, and the signal type corresponding to said button could be obtained by referring to the corresponding relation), and then controls the signal generator to emit the signals of said signal type with a corresponding strength based on the current shift position of the button.

Accordingly, the device for controlling a pan-tilt may acquire the images of the signal source from the monitored images and determine the signal type of the signal source according to the images of the signal source. Exemplarily, the device for controlling a pan-tilt may acquire the images of the signal source from the monitored images and determine the type of these signals according to the emission frequency (which can be determined based on the images) of the signals from the signal source. For example, these signals may either be state adjusting signals or position adjusting signals, wherein the state adjusting signals are used to set the state of the pan-tilt to an adjustable state; the position adjusting signals are used to enable the position of the pan-tilt to be adjusted according to the position of the signal source; and the process of adjusting the pan-tilt position may be a process of adjusting the angle (which may be an angle with respect to a fixed reference system that may either be a fixed surface on which the pan-tilt is located or a horizontal or vertical plane) of the pan-tilt. In the examples of the present disclosure, the pan-tilt may be an electric pan-tilt applicable for scanning and monitoring a wide range of regions, in which the scanning and monitoring function is enabled via two executive motors. The pan-tilts may be classified as horizontal pan-tilts only capable of rotating horizontally, and as all-direction pan-tilts capable of rotating in both horizontal and vertical direction, depending on the rotating characteristics thereof. Generally, the angle of a horizontal rotation (which is a rotating angle of the pan-tilt within the horizontal plane) is 0°-350°, and the angle of a vertical rotation (which is a rotating angle of the pan-tilt within the vertical plane) is 0°-90°. A constant-speed pan-tilt may have a horizontal rotating speed of 3°-10°/s, and a vertical rotating speed of 4°/s, more or less. A variable-speed pan-tilt may have a horizontal rotating speed of 0°-32°/s, and a vertical rotating speed of 0-16°/s or so. In some high-speed camera systems, the pan-tilt has a horizontal rotating speed of up to 480°/s or above and a vertical rotating speed of 120°/s or above. Of course, the above rotating angle and rotating speed are merely for the purpose of schematic illustration, and the pan-tilt may have other rotating angles and rotating speeds in actual applications.

In the examples of the present disclosure, the pan-tilt may be either a horizontal rotating pan-tilt or an all-direction pan-tilt. When signals emitted from the signal source as received by the device for controlling a pan-tilt are state adjusting signals, the state of the pan-tilt can be set to an adjustable state; after determining that the state of the pan-tilt is an adjustable state, the position of the pan-tilt can be adjusted according to the position of the signal source when the device for controlling a pan-tilt receives the position adjusting signals; and when the pan-tilt camera could not detect a signal source within the monitored region, the state of the pan-tilt can be set to a non-adjustable state.

The monitored images above are images obtained by the camera through shooting the monitored region.

Optionally, the device for controlling a pan-tilt may be integrated on the camera having an image analysis software prefabricated in the control system thereof, and the image analysis software can be used for extracting an image of the signal source from an acquired monitored image and analyzing the features of the signal source image; the device for controlling a pan-tilt may also be a device (which may be provided outside the camera) connected with the camera, for example, a separate image analysis device, which may be provided near the camera (for example on a housing of the camera) and connected with the camera. After acquiring the image, the camera transmits the image to the image analysis device, by which the image is analyzed to determine whether the image includes an image of the signal source and further the type of the signals emitted from the signal source. Of course, the device for controlling a pan-tilt may also be integrated within the pan-tilt, and the examples of the present disclosure do not put a limitation on the position of the device for controlling a pan-tilt.

Figure 2:
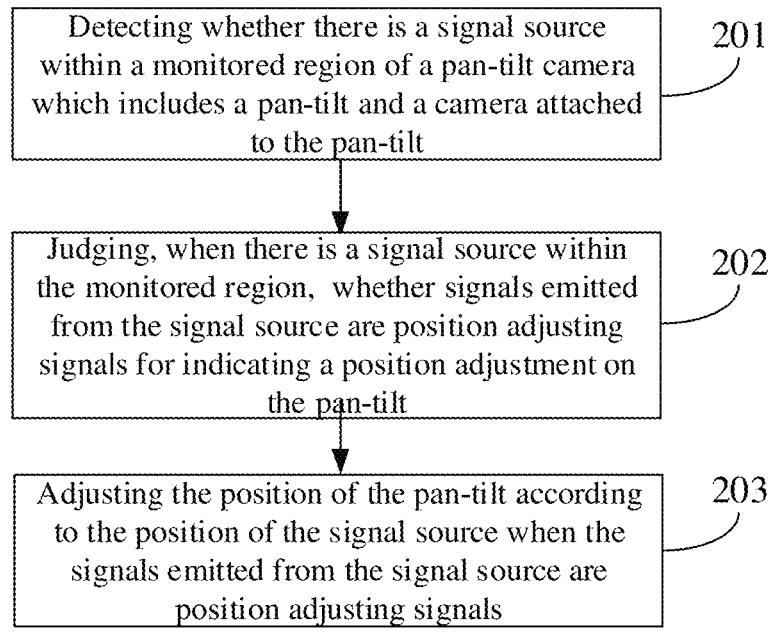
FIG. 2 is a flowchart of a method for controlling a pan-tilt according to examples of the present disclosure.

FIG. 2 is a flowchart of a method for controlling a pan-tilt according to examples of the present disclosure, applicable to the device for controlling a pan-tilt. As shown in FIG. 2, the method may include:

step 201, detecting whether there is a signal source within a monitored region of a pan-tilt camera which includes a pan-tilt and a camera attached to the pan-tilt;

step 202, when there is a signal source within the monitored region, judging whether signals emitted from the signal source are position adjusting signals for indicating a position adjustment on the pan-tilt; and step 203, when the signals emitted from the signal source are position adjusting signals, adjusting the position of the pan-tilt according to the position of the signal source.

In summary, according to the method for controlling a pan-tilt provided by the examples of the present disclosure, the device for controlling a pan-tilt is capable of: detecting whether there is a signal source within the monitored region; when there is a signal source within the monitored region, judging whether signals emitted from the signal source are position adjusting signals; when the signals emitted from the signal source are determined to be position adjusting signals, adjusting the position of the pan-tilt in the pan-tilt camera flexibly according to the position of the signal source, so that the pan-tilt camera can shoot the target region instantly, thereby effectively reducing the trigger delay of the control operation on the pan-tilt camera.

Figures 1, 3:
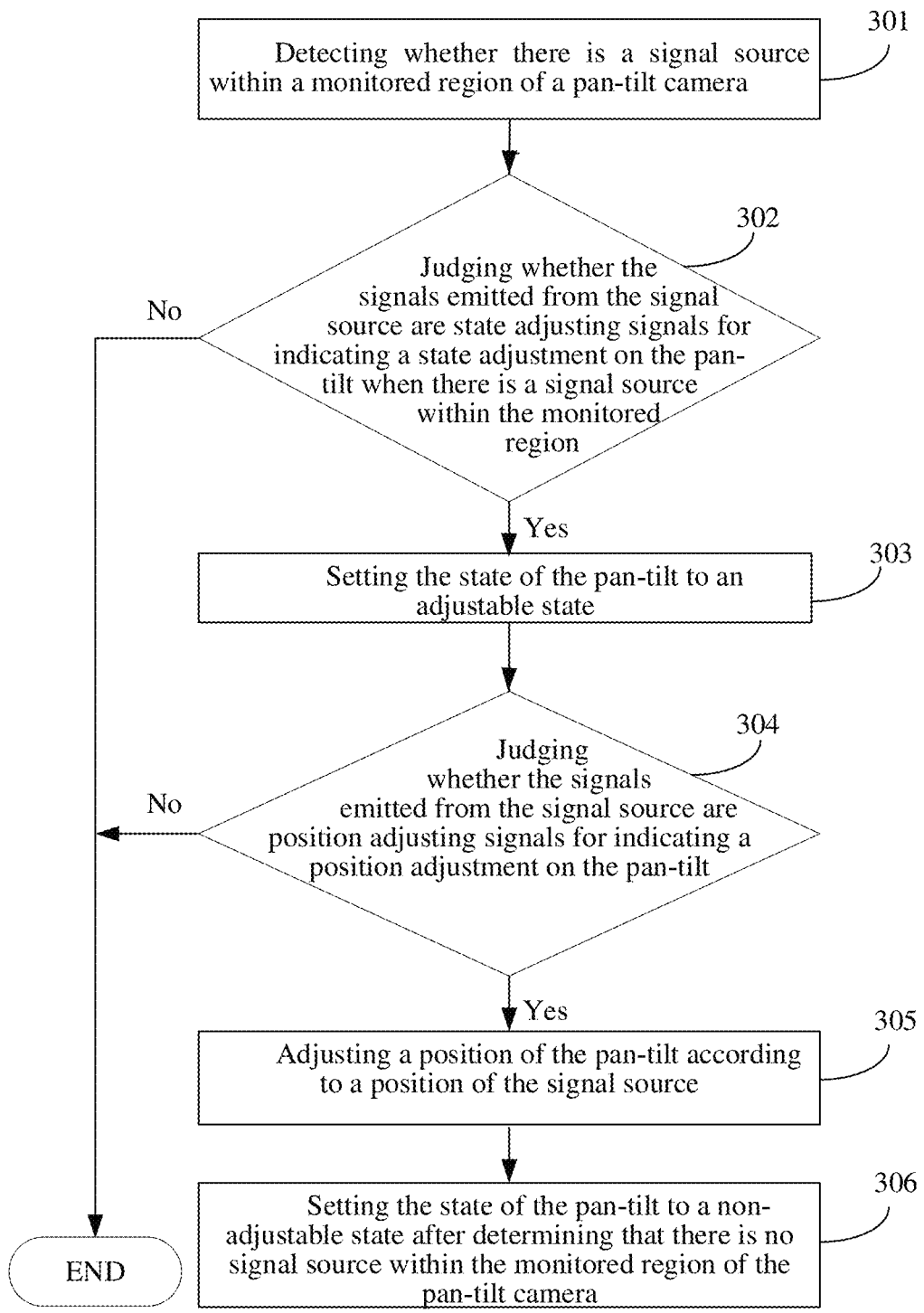
Figures 2, 3:
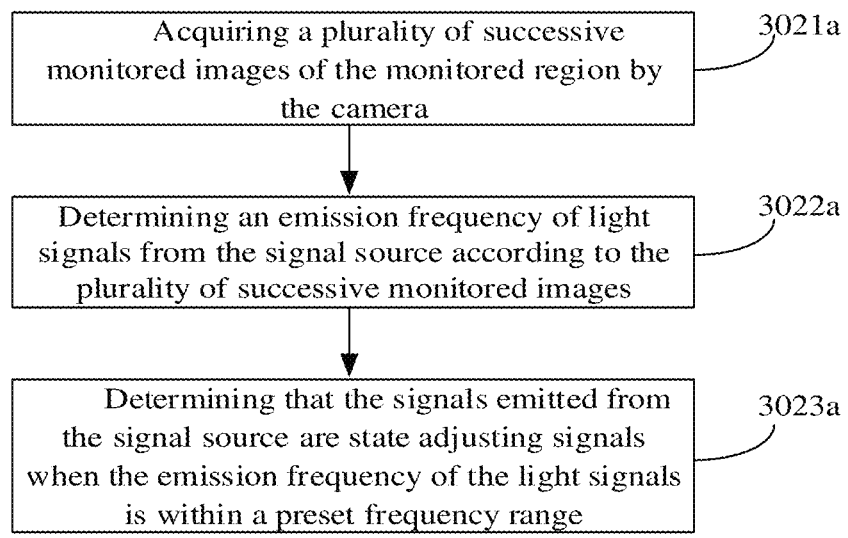
Figure 3:
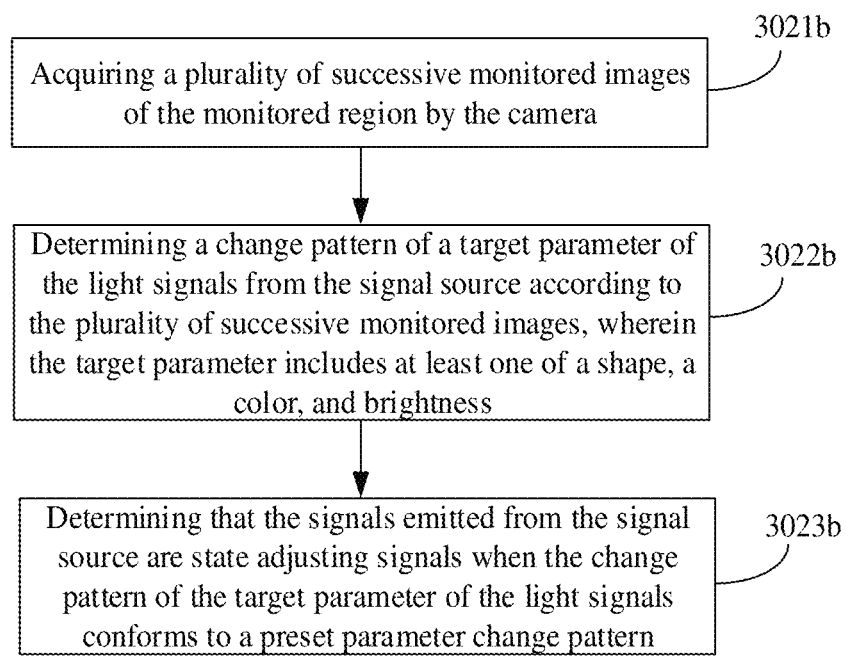

In the examples of the present disclosure, for describing in a convenient and concise way, the detailed explanations of the examples of the methods for controlling a pan-tilt are illustrated by taking a light source (which may be either a laser light source or a visible light source) being a signal source as an example, which is not a limitation on the type of the signal source. When the signal source is a light source, the signals emitted from the signal source are light signals. FIG. 3-1 is a flowchart of a method for controlling a pan-tilt applicable to the system for controlling a pan-tilt shown in FIG. 1 according to examples of the present disclosure. As shown in FIG. 3-1, the method may include:

step 301, detecting whether there is a signal source within a monitored region of a pan-tilt camera.

Referring to FIG. 1, the pan-tilt camera may include a pan-tilt and a camera attached to the pan-tilt.

Optionally, the process of detecting whether there is a signal source within a monitored region of a pan-tilt camera may include:

detecting whether there is an image of a signal source in monitored images from the camera, wherein the monitored images are obtained by the camera through shooting a monitored region; when there is an image of a signal source in the monitored images from the camera, determining that there is a signal source within the monitored region of the pan-tilt camera; and when there is no image of a signal source in the monitored images from the camera, determining that there is no signal source within the monitored region of the pan-tilt camera.

For example, a monitored image can be analyzed after being acquired by the camera, and by detecting whether the monitored image includes an image of the signal source, whether there is a signal source within the monitored region of the pan-tilt camera may be determined. In addition, the pan-tilt can be provided with a light sensor connected with the camera or the camera can be provided with a built-in light sensor, for analyzing the monitored image after receiving the light signals emitted by the light source.

In step 302, when there is a signal source within the monitored region, judging whether the signals emitted from the signal source are state adjusting signals for indicating a state adjustment on the pan-tilt is done; when the signals emitted from the signal source are state adjusting signals for indicating a state adjustment on the pan-tilt, step 303 is executed; and when the signals emitted from the signal source are not state adjusting signals for indicating a state adjustment on the pan-tilt, the method ends, or the step 301 can be executed again.

As an example, there may be many manners in judging whether the signals emitted from the signal source are state adjusting signals for indicating a state adjustment on the pan-tilt, and the following two manners are exemplarily illustrated in the examples of the present disclosure, which include:

as shown in FIG. 3-2, the first manner including:

step 3021a, acquiring a plurality of successive monitored images of the monitored region by the camera.

Optionally, when there is a signal source within the monitored region of the pan-tilt camera, a plurality of successive monitored images of the monitored region can be acquired by the camera. For example, the camera may acquire a plurality of successive monitored images in a 5-second period. It should be noted that the frequency at which the camera shoots images needs to be higher than the emission frequency of the light signals so as to effectively determine the emission frequency of the signal source in a subsequent process. As an example, it is workable to set a frequency threshold, set the frequency at which the camera shoots images to be higher than this frequency threshold, and set the emission frequency of light signals to be lower than or equal to this frequency threshold; or, to set the frequency at which the camera shoots images to be higher than or equal to this frequency threshold and set the emission frequency of the light signals to be lower than this frequency threshold.

In step 3022a, determining an emission frequency of light signals from the signal source according to the plurality of successive monitored images is done.

Optionally, the plurality of successive monitored images can be analyzed with the prefabricated image analysis software in the camera to acquire the image of the signal source from each monitored image, and then determine the emission frequency of the light signals from the signal source by means of the images of the signal source in the plurality of successive monitored images.

The plurality of monitored images as acquired may include the images of the signal source in which the signal source is emitting a light signal and the images of the signal source in which the signal source is not emitting a light signal. For example, it is assumed that 10 successive monitored images containing the images of the signal source are acquired. Among the 10 monitored images, the first, third, fifth, seventh and ninth monitored images show that the signal source is emitting a light signal, and the second, fourth, sixth, eighth and tenth monitored images show that the signal source is not emitting a light signal. On this basis, the emission frequency of the light signals from the signal source can be determined by analyzing a time interval between every two monitored images which show that the signal source is emitting a light signal.

As an example, after the camera acquires a plurality of successive monitored images and the images of the signal source are extracted by the prefabricated image analysis software, when the time intervals between every two monitored images showing the signal source emitting a light signal are equal and are m seconds, the reciprocal of the time interval between the every two monitored images showing the signal source emitting a light signal is determined to be the emission frequency, i.e. (1/m) Hz, of the light signals from the signal source. That is, the emission frequency of the light signals from the signal source indicates that the signal source emits one light signal every m seconds. For example, when the time intervals between every two monitored images showing the signal source emitting the light signal are equal and are 30 milliseconds (i.e., 0.03 seconds), it can be determined that the emission frequency of the light signals from the signal source is 1/0.03=(100/3), i.e. the signal source emits one light signal every 30 milliseconds.

When the time intervals between every two monitored images showing the signal source emitting the light signals are unequal, a reciprocal of a mean value of the time intervals of all the monitored images showing the signal source emitting the light signal is determined to be the emission frequency (in Hz) of the light signals from the signal source. For example, the time intervals between every two of the first, third, fifth, seventh and ninth monitored images are 31 milliseconds, 29 milliseconds, 30 milliseconds and 30 milliseconds, then the emission frequency of the light signals from the signal source is $1/[(0.031+0.029+0.030+0.030)/4]=(100/3)$ Hz, i.e. the signal source emits one light signal every 30 milliseconds.

In step 3023a, when the emission frequency of the light signals is within a preset frequency range, determining that the signals emitted from the signal source are state adjusting signals is done.

In the examples of the present disclosure, the requirement for determining the signals emitted from the signal source to be state adjusting signals may not only include the requirement that the emission frequency of the light signals is within a preset frequency range, but also include other requirements, for example, of time. As an example, the requirement may include the emission frequency of the light signals being within the present frequency range and the emission duration being longer than a preset period.

As an example, the requirement may be a preset frequency which indicates that the signal source emits a light signal every 30 milliseconds and a duration which indicates that light signals are emitted for more than 3 seconds, and when the signals emitted from the signal source meet this requirement, then it can be determined that signals emitted from the signal source are state adjusting signals.

As shown in FIG. 3-3, the second manner may include:

step 3021b, acquiring a plurality of successive monitored images of the monitored region by the camera.

Optionally, when there is a signal source within the monitored region of the pan-tilt camera, a plurality of successive monitored images of the monitored region can be acquired by the camera, for example, the camera can acquire a plurality of successive monitored images within a 5-second period.

In step 3022b, determining a change pattern of a target parameter of the light signals from the signal source according to the plurality of successive monitored images is done, wherein the target parameter includes at least one of a shape, a color, and brightness.

Optionally, the plurality of successive monitored images can be analyzed via the prefabricated image analysis software in the camera to acquire the images of the signal source from each monitored image, and then a change pattern of a target parameter of the light signals from the signal source could be determined by means of the images of the signal source in the plurality of successive monitored images. For example, the light signals from the signal source may alternate between different shapes (such as from square to circle), or alternate between red and green, or alternate between light and dark, or may alternate between combinations of at least two of a shape, a color or brightness. As an example, after the camera acquires a plurality of successive monitored images and the images of the signal source are extracted by the prefabricated image analysis software, when the images of the light signals in the monitored images within one second are green, the images of the light signals in the monitored images within the next second change to red, and the images of the light signals in the monitored images within the further next second change to green again, it can be determined that the change pattern of the target parameter of the light signals from the signal source is that green light signals and red light signals alternate with a one-second cycling time.

In step 3023b, when the change pattern of the target parameter of the light signals conforms to a preset parameter change pattern, determining that the signals emitted from the signal source are state adjusting signals is done.

As an example, it is assumed that a preset parameter change pattern may be that the light signals emitted from the signal source alternate between red and green. For example, red light signals may be emitted for a one-second duration, then being alternated to green light signals for another one-second duration, and then alternated back to red light signals for yet another one-second duration, and so on. When the signals emitted from the signal source meet this preset parameter change pattern, it can be determined that the signals emitted from the signal source are state adjusting signals.

In step 303, setting the state of the pan-tilt to an adjustable state is done.

In some embodiments, a pan-tilt may be fixedly provided or be regularly moved vertically and/or horizontally or in other orientations by a round-robin manner, or may be adjusted in position by a corresponding control operation performed by an operation personnel after logging in a client of a system for controlling a pan-tilt on a terminal device. In the examples of the present disclosure, when the device for controlling a pan-tilt receives the state adjusting signals, the state of the pan-tilt can be set to an adjustable state without needing to log in the client of the system for controlling a pan-tilt, and the trigger delay in the control operation for setting the adjustable state of the pan-tilt can be reduced effectively.

In step 304, judging whether the signals emitted from the signal source are position adjusting signals for indicating a position adjustment on the pan-tilt is done; when the signals emitted from the signal source are position adjusting signals for indicating a position adjustment on the pan-tilt, step 305 is executed; and when the signals emitted from the signal source are not position adjusting signals for indicating a position adjustment on the pan-tilt, the method ends, or the above step 301 can be executed again.

Optionally, the position adjusting signals may be either different from or the same as the state adjusting signals, and when the position adjusting signals are the same as the state adjusting signals, the method for judging whether signals emitted from the signal source are state adjusting signals for indicating a state adjustment on the pan-tilt can be referred to when judging whether the signals emitted from the signal source are position adjusting signals for indicating a position adjustment on the pan-tilt. It is not repeated here.

Figures 3, 4:
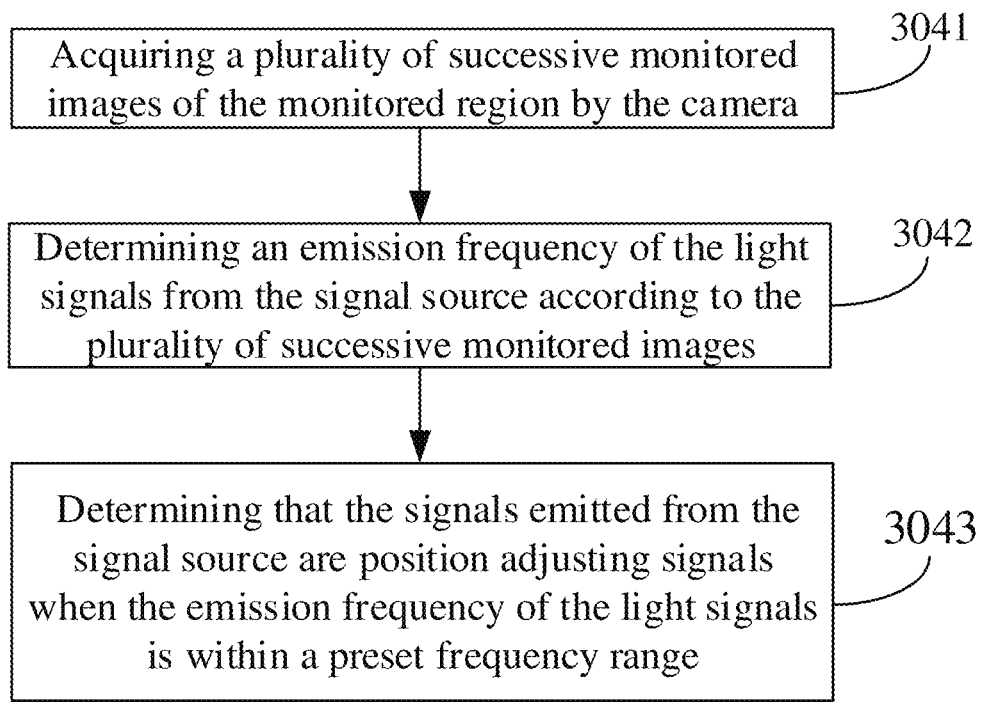

Optionally, when the position adjusting signals are different from the state adjusting signals, it is required to judge whether signals emitted from the signal source are position adjusting signals for indicating a position adjustment on the pan-tilt after determining that the pan-tilt is in an adjustable state. The following two manners of judging whether the signals emitted from the signal source are position adjusting signals for indicating a position adjustment on the pan-tilt are illustrated exemplarily in the examples of the present disclosure, and the two manners include:

as shown in FIG. 3-4, the first manner including:

step 3041, acquiring a plurality of successive monitored images of the monitored region by the camera.

Optionally, when there is a signal source within the monitored region of the pan-tilt camera, a plurality of successive monitored images of the monitored region can be acquired by the camera. For example, the camera can acquire a plurality of successive monitored images within a 5-second period. Step 3021a may be referred to for this process.

In step 3042, determining an emission frequency of the light signals from the signal source according to the plurality of successive monitored images is done.

Step 3022a may be referred to for the process of step 3042.

Optionally, the plurality of successive monitored images can be analyzed via the prefabricated image analysis software in the camera to acquire the images of the signal source from each monitored image, and then the emission frequency of the light signals from the signal source could be determined by means of the images of the signal source from the plurality of successive monitored images. As an example, after the camera acquires a plurality of successive monitored images and the images of the signal source are extracted by the prefabricated image analysis software, when the time intervals between the monitored images with the signal source being emitting a light signal are determined to be equal and are 30 milliseconds (i.e. 0.03 seconds) based on the extracted images of the signal source, it can be determined that the emission frequency of the light signals from the signal source is 1/0.03=(100/3) Hz, i.e. the signal source emits one light signal every 30 milliseconds.

In step 3043, when the emission frequency of the light signals is within a preset frequency range, determining that the signals emitted from the signal source are position adjusting signals is done.

Step 3023a may be referred to for this process.

In the examples of the present disclosure, the requirement with respect to the emission frequency for determining the signals emitted from the signal source to be position adjusting signals may also involve other requirements. As an example, it is assumed that the preset frequency indicates the signal source emitting a light signal continuously, and when the signals emitted from the signal source meet the requirement of the present frequency, it can be determined that the signals emitted from the signal source are state adjusting signals. As an example, the device for controlling a pan-tilt can acquire a plurality of successive monitored images of the monitored region within a specified duration via the camera (step 3041 above could be referred to for this process), and then the device for controlling a pan-tilt determines whether the signal source continuously emits light signals within the specified duration according to the plurality of successive monitored images. For example, when each of the monitored images acquired shows that the signal source is emitting a light signal, it can be determined that the signal source continuously emits light signals within this specified duration.

For the detailed process for implementing the second manner, steps 3021b to 3023b can be referred to, and a detailed description thereof is not repeated here.

In step 305, adjusting a position of the pan-tilt according to a position of the signal source is done.

In some examples of the present disclosure, the angle of the pan-tilt can be adjusted according to the position of the signal source. For example, by fixing one end of the pan-tilt and driving the other end of the pan-tilt connected with the camera via a motor attached to the pan-tilt to move in at least one of upwards, downwards, leftwards or rightwards, or, driving the whole pan-tilt via the motor to move upwards, downwards, leftwards or rightwards, so as to adjust the angle of the pan-tilt, the images of the signal source acquired by the camera could be located within a preset region in the monitored images from the camera.

Optionally, the preset region can be a center region of a monitored image, and the center region includes a center point of the monitored image and may be a triangular, round or square region and the like.

As an example, adjusting an angle of the pan-tilt according to the position of the signal source may include:

based on the monitored image acquired by the camera at a previous moment, determining a relative position of the image of the signal source with respect to the center region, and then, according to the relative position, adjusting the position of the pan-tilt partly or wholly, so that the images of the signal source in the monitored images acquired by the camera gradually approach the center region until an image of the signal source is located within the center region in the monitored image from the camera.

Figures 3, 4, 5:
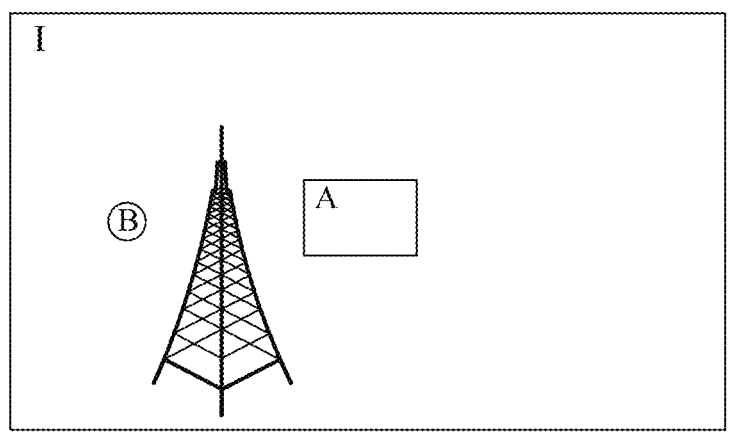

It is assumed that the monitored image I acquired by the camera at a previous moment is as shown in FIG. 3-5, with the image B of the signal source being outside the center region A of the monitored image I but located to the left of the center region A of the monitored image I, the device for controlling a pan-tilt may control the pan-tilt to rotate to the left so that the image B of the signal source is moved within the center region A' of the monitored image I'; and the monitored image I' acquired at the current moment may be as shown in FIG. 3-6, with a base station in FIG. 3-5 and FIG. 3-6 as a schematic reference system. During the actual applications, it generally only needs to analyze the monitored images based on the internal reference system of the camera, without referring to the external reference system of the camera. The method for controlling a pan-tilt provided by the examples of the present disclosure can flexibly adjust the angle of the pan-tilt according to the position of the signal source and enable the camera to change the monitored region instantly by rapidly adjusting the angle of the pan-tilt, thereby effectively reducing the delay, for example, a trigger delay.

Further, when the signal source is a point light source, the position of the pan-tilt can be adjusted according to the position of the signal source so that the image of the signal source captured by the camera coincides with a center point of the monitored image from the camera, whereby the image of the signal source is located within the very center of the image shot by the camera, enabling an accurate position adjustment of the pan-tilt.

It should be noted that the preset region in the examples of the present disclosure may also be other specific regions in the monitored image, but not limited to the center region.

In step 306, after determining that there is no signal source within the monitored region of the pan-tilt camera, setting the state of the pan-tilt to a non-adjustable state is done.

After determining that there is no signal source within the monitored region of the pan-tilt camera, the state of the pan-tilt can be set to a non-adjustable state, to prevent some interference signals similar to the position adjusting signals emitted from the signal source from changing the monitored region of the pan-tilt camera and disturbing the monitoring of the camera.

During the actual applications, there are many types of signal sources. When a pickup function is not provided in the camera, the signal source may be a light source, a human body or other imageable substances. When the signal source is a light source, signals emitted from the signal source may be a light signal. For example, signals emitted from the signal source may be laser light signals when the signal source is a laser light source, or may be visible light when the signal source is a visible light source. For detailed examples in which the signal source is a light source, steps 301-306 can be referred to, and a description thereof is not repeated here. When the signal source is a human body, signals emitted from the signal source can be gesture signals. For example, when the operation personnel gesticulates with " ", i.e., a gesture indicating "OK", the camera acquires a monitored image having this gesture and then sets the pan-tilt to an adjustable state, and when the operation personnel moves while making this gesture, the pan-tilt can adjust the position of the pan-tilt according to the position of the gesture. This signal source has low cost since there is no need to change the hardware of the pan-tilt camera, but it only needs to provide a prefabricated image analysis software so that the pan-tilt can be controlled. Alternatively, when a pickup function is provided in the camera, the signal source may be a sound source, and the signals emitted from the signal source can be audible signals. For example, when the camera acquires an audible signal such as "Start", the pan-tilt would be set to the adjustable state, and when the camera acquires a voice instruction such as "rotate to the left" or "rotate to the right", the pan-tilt can execute a corresponding adjustment action according to the voice instruction. This signal source has low cost since there is no need to change the hardware of the pan-tilt camera, but it only needs to provide a prefabricated voice analysis software so that the pan-tilt can be controlled.

The signal source may also emit certain kind of electromagnetic signals or infrared signals, and the pan-tilt can also be controlled by fixedly mounting an electromagnetic inductor or an infrared receiver on the pan-tilt of the pan-tilt camera. For example, when the electromagnetic inductor/infrared receiver receives electromagnetic signals/infrared signals at a preset frequency band from a certain direction, the pan-tilt can be set to the adjustable state, and the position of the pan-tilt could be adjusted according to the emission direction of the electromagnetic signals/infrared signals, so that the emission direction of the electromagnetic signals/infrared signals corresponds to the preset position of the electromagnetic inductor/infrared receiver. The examples of the present disclosure does not put a limitation on the type of the signal source.

It should be noted that the sequential order of the steps of the method for controlling a pan-tilt according to the examples of the present disclosure can be adjusted when appropriate, and the steps may also be deleted or new steps may be added according to requirements. Any variation made to the method readily conceivable from the technical scope disclosed by the present disclosure for any person skilled in the art shall fall within the protection scope of the present disclosure. Therefore, a detailed description is not repeated here.

In summary, according to the methods for controlling a pan-tilt provided by the examples of the present disclosure, the devices for controlling a pan-tilt are capable of: detecting whether there is a signal source within the monitored region; when there is a signal source within the monitored region, judging whether signals emitted from the signal source are position adjusting signals; when the signals emitted from the signal source are determined to be the position adjusting signals, adjusting the position of the pan-tilt in the pan-tilt camera flexibly according to the position of the signal source, so that the pan-tilt camera can shoot the target region instantly, thereby effectively reducing the trigger delay of the control operation on the pan-tilt camera.

FIG. 4 is a schematic structural diagram of a device for controlling a pan-tilt 40 according to examples of the present disclosure. As shown in FIG. 4, the device 40 may include:

a detecting module 401 configured to detect whether there is a signal source within a monitored region of a pan-tilt camera which includes a pan-tilt and a camera attached to the pan-tilt;

a first judging module 402 configured to judge, when there is a signal source within the monitored region, whether signals emitted from the signal source are position adjusting signals for indicating a state adjustment on the pan-tilt; and an adjusting module 403 configured to adjust, when the signals emitted from the signal source are position adjusting signals, a position of the pan-tilt according to a position of the signal source.

In summary, the devices for controlling a pan-tilt provided by the examples of the present disclosure are capable of: detecting whether there is a signal source within the monitored region by a detecting module; when there is a signal source within the monitored region, judging whether signals emitted from the signal source are position adjusting signals by a first judging module; when the signals emitted from the signal source are determined to be position adjusting signals, adjusting the position of the pan-tilt in the pan-tilt camera flexibly by an adjusting module according to the position of the signal source, so that the pan-tilt camera can shoot the target region instantly, thereby effectively reducing the trigger delay of the control operation the pan-tilt camera.

Optionally, the adjusting module 403 may be configured to:

adjust a position of the pan-tilt so that images of the signal source captured by the camera are located within a preset region in the monitored images from the camera, wherein the monitored images are images obtained by the camera through shooting the monitored region.

Optionally, as shown in FIG. 5-1, the detecting module 401 may include:

a detecting submodule 4011 configured to detect whether there is an image of a signal source in monitored images from the camera, wherein the monitored images are images obtained by the camera through shooting the monitored region;

a first determining submodule 4012 configured to determine, when there is an image of a signal source in the monitored images from the camera, that there is a signal source within the monitored region of the pan-tilt camera; and a second determining submodule 4013 configured to determine, when there is no image of a signal source in the monitored images from the camera, that there is no signal source within the monitored region of the pan-tilt camera.

Optionally, the signal source may be a light source, the signals may be light signals, and in one aspect, the first judging module 402 may be configured to:

acquire a plurality of successive monitored images of the monitored region by the camera; determine an emission frequency of the light signals from the signal source according to the plurality of successive monitored images; and when the emission frequency of the light signals is in a preset frequency range, determine that the signals emitted from the signal source are position adjusting signals.

In another aspect, the first judging module 402 may be configured to:

acquire a plurality of successive monitored images of the monitored region by the camera; determine a change pattern of a target parameter of the light signals from the signal source according to the plurality of successive monitored images, wherein the target parameter includes at least one of a shape, a color, or brightness; and when the change pattern of the target parameter of the light signals conforms to a preset parameter change pattern, determine that the signals emitted from the signal source are state adjusting signals.

Further, as shown in FIG. 5-2, the device 40 may further include:

a second judging module 404 configured to judge whether the signals emitted from the signal source are state adjusting signals for indicating a state adjustment on the pan-tilt, wherein the state adjusting signals are different from the position adjusting signals; and a first setting module 405 configured to set, when the signals emitted from the signal source are state adjusting signals, a state of the pan-tilt to an adjustable state.

Yet further, as shown in FIG. 5-3, the device 40 may further include:

a second setting module 406 configured to set, after determining that there is no signal source within the monitored region of the pan-tilt camera, the state of the pan-tilt to a non-adjustable state.

Optionally, the preset region may be a center region of the monitored image, and the signal source may be a point light source; and correspondingly, the adjusting module 403 may be configured to:

adjust the position of the pan-tilt so that the images of the signal source captured by the camera coincide with a center point of the monitored images from the camera.

Those skilled in the art may clearly understand that, for describing in a convenient and concise way, with respect to the devices in the above examples, the specific operating manners of each module are not described in detail here since they have been described in detail in the corresponding method examples.

In summary, the devices for controlling a pan-tilt provided by the examples of the present disclosure are capable of: detecting whether there is a signal source within the monitored region by a detecting module; when there is a signal source within the monitored region, judging whether signals emitted from the signal source are position adjusting signals by a first judging module; when the signals emitted from the signal source are determined to be position adjusting signals, adjusting the position of the pan-tilt in the pan-tilt camera flexibly by an adjusting module according to the position of the signal source, so that the pan-tilt camera can shoot the target region instantly, thereby effectively reducing the trigger delay of the control operation on the pan-tilt camera.

The examples of the present disclosure provide a system for controlling a pan-tilt, which may include: a device for controlling a pan-tilt 40 as shown in any of FIG. 4, FIG. 5-2 and FIG. 5-3, a signal source and a pan-tilt camera, and the pan-tilt camera includes a pan-tilt and a camera attached to the pan-tilt.

Optionally, the device for controlling a pan-tilt can be integrated in the camera.

The examples of the present disclosure also provide a device for controlling a pan-tilt, which includes: one or more processors; and a memory. One or more programs are stored in the memory and configured to be executed by the one or more processors to perform the method for controlling a pan-tilt of any of the above examples.

Figures 3, 4, 5, 6:
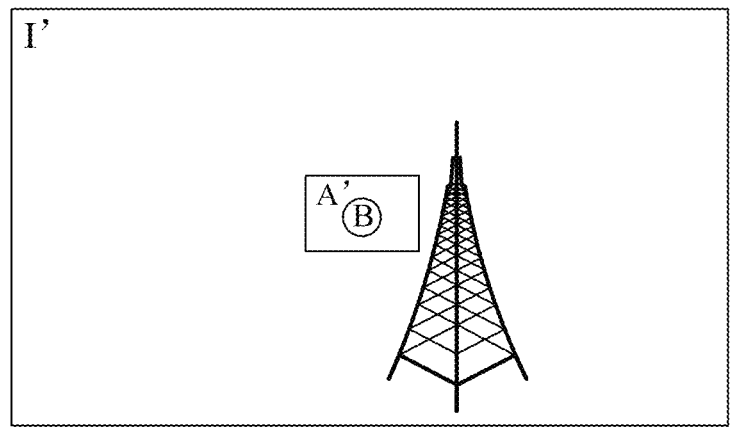
Figure 4:
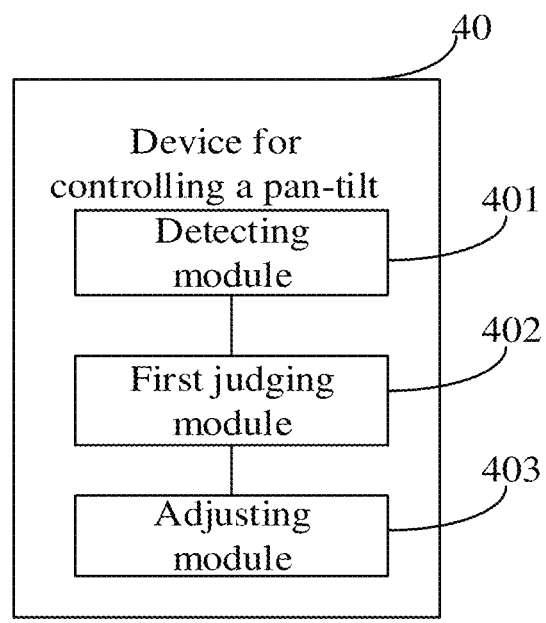
Figures 1, 5:
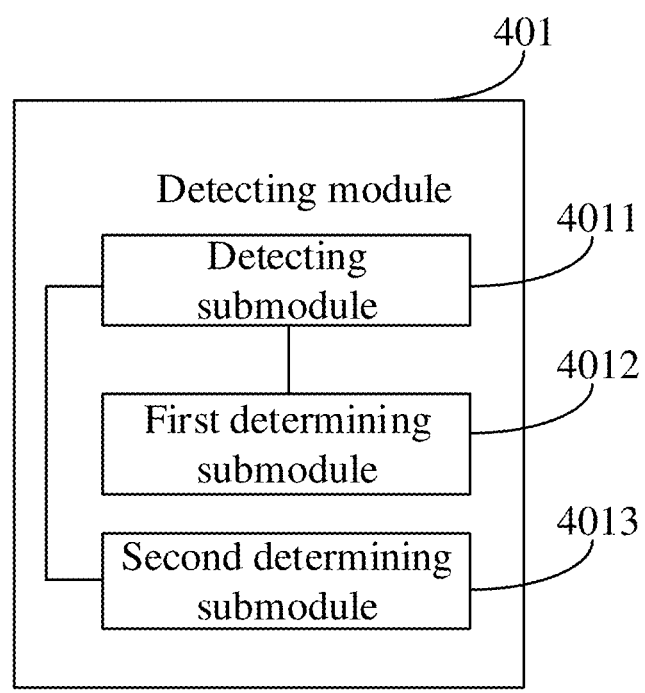
Figures 2, 5:
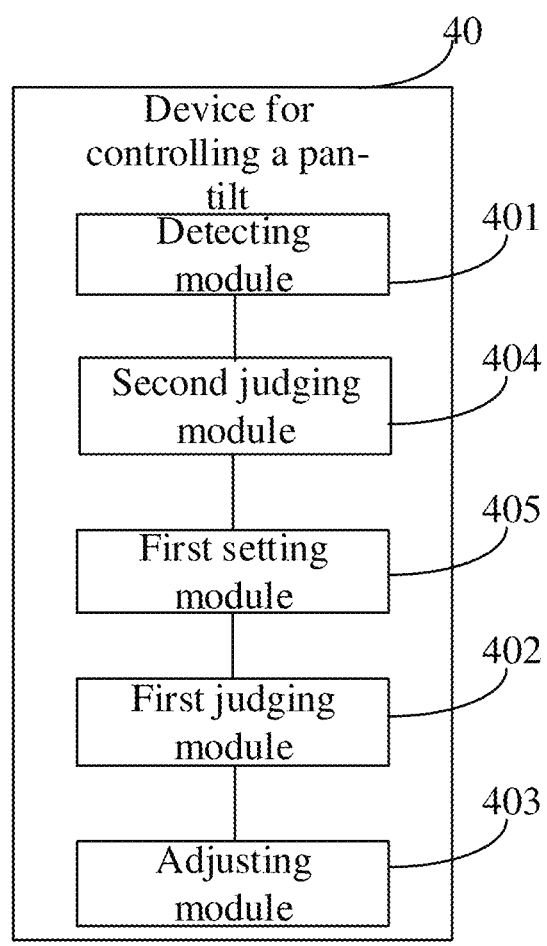
Figures 3, 5:
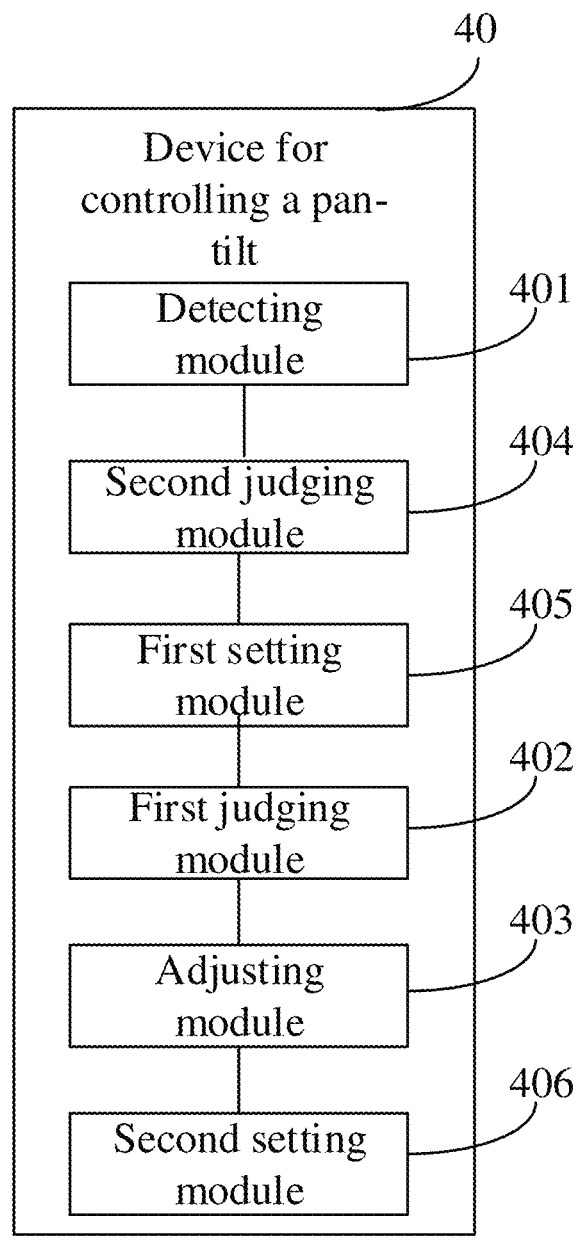
Figure 6:
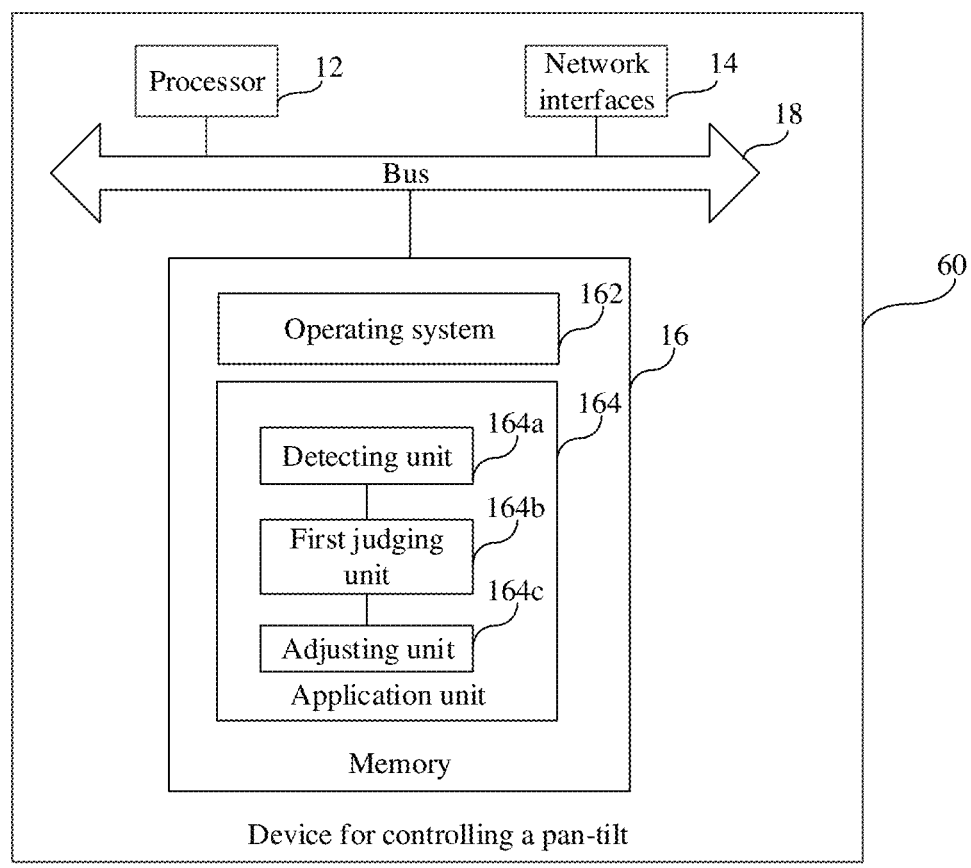

As an example, FIG. 6 is a schematic structural diagram of a device for controlling a pan-tilt 60 according to examples of the present disclosure. As shown in FIG. 6, the device for controlling a pan-tilt 60 includes: a processor 12 and a network interface 14.

The processor 12 includes one or more processing cores. The processor 12 executes various functional applications and data processing by running a software program and unit.

There may be multiple network interfaces 14, which are configured to communicate with other storage devices or network devices.

Optionally, the device for controlling a pan-tilt 60 may further include a memory 16, a bus 18 and other components. Moreover, the memory 16 and the network interface 14 are connected with the processor 12 through a bus 18 respectively.

The memory 16 can be configured to store the software program and the unit. Specifically, the memory 16 may store an operating system 162, and at least one application unit 164 required by the function. The operating system 162 may be a real-time operating system (Real Time eXecutive, RTX), LINUX, UNIX, WINDOWS or OS X and other operating systems. Moreover, the application unit 164 may include a detection unit 164*a*, a first judging unit 164*b* and an adjusting unit 164*c*.

The detecting unit 164*a* has a function the same as or similar to that of the detecting module 401.

The first judging unit 164*b* has a function the same as or similar to that of the first judging module 402.

The adjusting unit 164*c* has a function the same as or similar to that of the adjusting module 403.

With respect to the devices in the above examples, the specific operating manners of the respective modules have been described in detail in the relative method examples, and are not repeated here.

The examples of the present disclosure provide a system for controlling a pan-tilt, which may include: a device for controlling a pan-tilt 60 as shown in FIG. 6 and a pan-tilt camera, and the pan-tilt camera includes a pan-tilt and a camera attached to the pan-tilt.

Optionally, the system for controlling a pan-tilt also includes a signal source.

Optionally, the device for controlling a pan-tilt can be integrated in the camera.

In an example, a non-volatile computer-readable storage medium having code instructions stored therein is also provided, wherein the code instructions are executed by a processor to perform the above method for controlling a pan-tilt. For example, the non-volatile computer-readable storage medium may be a memory including instructions, such as a ROM, a random access memory (RAM), CD-ROM, a magnetic tape, a floppy disk, an optical data storage device and the like.

With respect to the system in the above examples, the specific operating manners of the respective devices have been described in detail in the relative method examples, and are not repeated here.

Persons of ordinary skill in the art can understand that all or parts of the steps described in the above examples can be achieved through hardware, or through relevant hardware instructed by applications stored in a computer-readable storage medium, such as read-only memory, disk or CD, etc.

The foregoing descriptions are merely optional examples of the present disclosure, and are not intended to limit the present disclosure. Any modifications, equivalent substitutions, improvements or the like within the spirit and principles of the disclosure are to be encompassed within the protection scope of the present disclosure.

The invention claimed is:

1. A method for controlling a pan-tilt, used in a device for controlling a pan-tilt, the method comprising:
  detecting whether there is a signal source within a monitored region of a pan-tilt camera, the pan-tilt camera comprising a pan-tilt and a camera attached to the pan-tilt;
  judging, when there is a signal source within the monitored region, whether signals emitted from the signal source are position adjusting signals for indicating a position adjustment on the pan-tilt; and
  adjusting a position of the pan-tilt according to a position of the signal source when the signals emitted from the signal source are position adjusting signals;
  wherein before said judging whether signals emitted from the signal source are position adjusting signals for indicating a position adjustment on the pan-tilt, the method further comprises:
  judging whether the signals emitted from the signal source are state adjusting signals for setting a state of the pan-tilt to an adjustable state; and
  setting the state of the pan-tilt to the adjustable state when the signals emitted from the signal source are state adjusting signals,
  wherein the state of the pan-tilt being set to the adjustable state indicates that the position of the pan-tilt is permissible to be adjusted, and wherein the state of the pan-tilt being set to a non-adjustable state indicates that the position of the pan-tilt is impermissible to be adjusted;
  wherein judging whether the signals emitted from the signal source are state adjusting signals comprises:
    acquiring a plurality of successive monitored images of the monitored region by the camera; determining an emission frequency of light signals from the signal source according to the plurality of successive monitored images; and determining that the signals emitted from the signal source are state adjusting signals based on the emission frequency of the light signals being within a preset frequency range corresponding to state adjusting signals; or
    determining a change pattern of a target parameter of the light signals from the signal source according to the plurality of successive monitored images, wherein the target parameter includes at least one of a shape, a color, and brightness; and determining that the signals emitted from the signal source are state adjusting signals based on the change pattern of the target parameter of the light signals conforming to a preset parameter change pattern corresponding to state adjusting signals.

2. The method according to claim 1, wherein
said adjusting a position of the pan-tilt according to a position of the signal source comprises:
  adjusting an angle of the pan-tilt so that images of the signal source captured by the camera are located within a preset region in monitored images from the camera, wherein the monitored images are images obtained by the camera through shooting the monitored region.

3. The method according to claim 1, wherein
said detecting whether there is a signal source within a monitored region of a pan-tilt camera comprises:
  detecting whether there is an image of a signal source in monitored images from the camera, wherein the monitored images are images obtained by the camera through shooting the monitored region;

determining that there is a signal source within the monitored region of the pan-tilt camera when there is an image of a signal source in the monitored images from the camera; and determining that there is no signal source within the monitored region of the pan-tilt camera when there is no image of a signal source in the monitored images from the camera.

4. The method according to claim 1, wherein the signal source is a light source, the signals are light signals, and said judging whether signals emitted from the signal source are position adjusting signals for indicating a position adjustment on the pan-tilt comprises:

acquiring a plurality of successive monitored images of the monitored region by the camera;

determining the emission frequency of the light signals from the signal source according to the plurality of successive monitored images; and determining that the signals emitted from the signal source are position adjusting signals when the emission frequency of the light signals is within a preset frequency range corresponding to position adjusting signals.

5. The method according to claim 1, wherein the signal source is a light source, the signals are light signals, and said judging whether signals emitted from the signal source are position adjusting signals for indicating a position adjustment on the pan-tilt comprises:

acquiring a plurality of successive monitored images of the monitored region by the camera;

determining the change pattern of a target parameter of the light signals from the signal source according to the plurality of successive monitored images; and determining that the signals emitted from the signal source are position adjusting signals when the change pattern of the target parameter of the light signals conforms to a preset parameter change pattern corresponding to position adjusting signals.

6. The method according to claim 1, wherein after said adjusting a position of the pan-tilt according to a position of the signal source, the method further comprises:

setting the state of the pan-tilt to a non-adjustable state after determining that there is no signal source within the monitored region of the pan-tilt camera.

7. The method according to claim 2, wherein the preset region is a center region of a monitored image, the signal source is a point light source; and said adjusting an angle of the pan-tilt so that images of the signal source captured by the camera are located within a preset region in monitored images from the camera comprises:

adjusting the angle of the pan-tilt so that the images of the signal source captured by the camera coincide with a center point of the monitored images from the camera.

8. A device for controlling a pan-tilt, comprising:
one or more processors; and
a memory,
wherein one or more programs are stored in the memory and configured to be executed by the one or more processors to perform the following operations:

detecting whether there is a signal source within a monitored region of a pan-tilt camera, the pan-tilt camera comprising a pan-tilt and a camera attached to the pan-tilt;

judging, when there is a signal source within the monitored region, whether signals emitted from the signal source are position adjusting signals for indicating a position adjustment on the pan-tilt; and adjusting a position of the pan-tilt according to a position of the signal source when the signals emitted from the signal source are position adjusting signals;

wherein the operations further comprise:

judging whether the signals emitted from the signal source are state adjusting signals for setting a state of the pan-tilt to an adjustable state; and setting the state of the pan-tilt to the adjustable state when the signals emitted from the signal source are state adjusting signals, wherein the state of the pan-tilt being set to the adjustable state indicates that the position of the pan-tilt is permissible to be adjusted, and wherein the state of the pan-tilt being set to a non-adjustable state indicates that the position of the pan-tilt is impermissible to be adjusted;

wherein the operations further comprise:

acquiring the plurality of successive monitored images of the monitored region by the camera, determining an emission frequency of light signals from the signal source according to the plurality of successive monitored images is done, determining that the signals emitted from the signal source are state adjusting signals based on the emission frequency of the light signals being within a preset frequency range corresponding to state adjusting signals; or determining a change pattern of a target parameter of the light signals from the signal source according to the plurality of successive monitored images is done, wherein the target parameter includes at least one of a shape, a color, and brightness, determining that the signals emitted from the signal source are state adjusting signals based on the change pattern of the target parameter of the light signals conforming to a preset parameter change pattern corresponding to state adjusting signals.

9. The device according to claim 8, wherein the one or more programs are configured to be executed by the one or more processors to perform the following operations:

adjusting an angle of the pan-tilt so that images of the signal source captured by the camera are located within a preset region in monitored images from the camera, wherein the monitored images are images obtained by the camera through shooting the monitored region.

10. The device according to claim 8, wherein the one or more programs are configured to be executed by the one or more processors to perform the following operations:

detecting whether there is an image of a signal source in monitored images from the camera, wherein the monitored images are images obtained by the camera through shooting the monitored region;

determining that there is a signal source within the monitored region of the pan-tilt camera when there is an image of a signal source in the monitored images from the camera; and determining that there is no signal source within the monitored region of the pan-tilt camera when there is no image of a signal source in the monitored images from the camera.

11. The device according to claim 8, wherein the signal source is a light source, the signals are light signals, and the one or more programs are configured to be executed by the one or more processors to perform the following operations:

acquiring a plurality of successive monitored images of the monitored region by the camera;

determining the emission frequency of the light signals from the signal source according to the plurality of successive monitored images; and determining that the signals emitted from the signal source are position adjusting signals when the emission frequency of the light signals is within a preset frequency range corresponding to position adjusting signals.

12. The device according to claim 8, wherein the signal source is a light source, the signals are light signals, and the one or more programs are configured to be executed by the one or more processors to perform the following operations:

acquiring a plurality of successive monitored images of the monitored region by the camera;

determining the change pattern of a target parameter of the light signals from the signal source according to the plurality of successive monitored images; and determining that the signals emitted from the signal source are position adjusting signals when the change pattern of the target parameter of the light signals conforms to a preset parameter change pattern corresponding to position adjusting signals.

13. The device according to claim 8, wherein the one or more programs are configured to be executed by the one or more processors to perform the following operations:

setting the state of the pan-tilt to a non-adjustable state after determining that there is no signal source within the monitored region of the pan-tilt camera.

14. The device according to claim 9, wherein the preset region is a center region of a monitored image, the signal source is a point light source, and wherein the one or more programs are configured to be executed by the one or more processors to perform the following operations:

adjusting the angle of the pan-tilt so that the images of the signal source captured by the camera coincide with a center point of the monitored images from the camera.

15. A non-volatile computer-readable storage medium having code instructions stored therein, wherein the code instructions are executed by a processor to perform a method for controlling a pan-tilt, wherein the method is used in a device for controlling a pan-tilt, and wherein the method comprises:

detecting whether there is a signal source within a monitored region of a pan-tilt camera, the pan-tilt camera comprising a pan-tilt and a camera attached to the pan-tilt;

judging, when there is a signal source within the monitored region, whether signals emitted from the signal source are position adjusting signals for indicating a position adjustment on the pan-tilt; and adjusting a position of the pan-tilt according to a position of the signal source when the signals emitted from the signal source are position adjusting signals;

wherein before said judging whether signals emitted from the signal source are position adjusting signals for indicating a position adjustment on the pan-tilt, the method further comprises:

judging whether the signals emitted from the signal source are state adjusting signals for setting a state of the pan-tilt to an adjustable state; and setting the state of the pan-tilt to the adjustable state when the signals emitted from the signal source are state adjusting signals, wherein the state of the pan-tilt being set to the adjustable state indicates that the position of the pan-tilt is permissible to be adjusted, and wherein the state of the pan-tilt being set to a non-adjustable state indicates that the position of the pan-tilt is impermissible to be adjusted;

wherein judging whether the signals emitted from the signal source are state adjusting signals comprises:

acquiring the plurality of successive monitored images of the monitored region by the camera, determining an emission frequency of light signals from the signal source according to the plurality of successive monitored images is done, determining that the signals emitted from the signal source are state adjusting signals based on the emission frequency of the light signals being within a preset frequency range corresponding to state adjusting signals; or determining a change pattern of a target parameter of the light signals from the signal source according to the plurality of successive monitored images is done, wherein the target parameter includes at least one of a shape, a color, and brightness, determining that the signals emitted from the signal source are state adjusting signals based on the change pattern of the target parameter of the light signals conforming to a preset parameter change pattern corresponding to state adjusting signals.

16. The method according to claim 1, wherein the signal source is provided with one button, the button having at least one shift position which is distinguishably controlled by varying at least one of pressing force, pressing orientation, or number of pressing times; and wherein the method further comprises:

determining a signal type corresponding to a certain shift position that the button is adjusted to, and controlling the signal source to emit a corresponding type of signals.

17. The method according to claim 1, wherein the signal source is provided with at least two buttons, each button having at least one shift position and corresponding to one signal type, and each shift position of a button corresponding to one type of signal emission strength; and wherein the method further comprises:

determining the signal type corresponding to a certain button which is pressed, and controlling the signal source to emit the signals of the signal type with a corresponding strength based on the current shift position of the certain button.

18. The method according to claim 1, wherein the device for controlling the pan-tilt is integrated on the camera; or the device for controlling the pan-tilt is provided on a housing of the camera and is connected with the camera; or the device for controlling the pan-tilt is integrated within the pan-tilt.

19. The method according to claim 7, wherein said adjusting the angle of the pan-tilt so that the images of the signal source captured by the camera coincide with a center point of the monitored images from the camera comprises:

determining, based on a monitored image acquired by the camera at a previous moment, a relative position of the image of the signal source with respect to the center region; and adjusting, according to the relative position, the position of the pan-tilt partly or wholly, so that the images of the signal source in the monitored images acquired by the camera gradually approach the center region until an image of the signal source is located within the center region in the monitored image from the camera.

* * * * *